United States Patent [19]
James et al.

[11] Patent Number: 5,199,771
[45] Date of Patent: Apr. 6, 1993

[54] NOT RETAINING CLEAT FOR VEHICLE ENDLESS TRACK

[75] Inventors: M. Elmer James, Mendon; Dennis Craghead, Logan, both of Utah

[73] Assignee: Logan Manufacturing Company, Logan, Utah

[21] Appl. No.: 844,770

[22] Filed: Mar. 2, 1992

[51] Int. Cl.⁵ ............................................. B62D 55/26
[52] U.S. Cl. .................... 305/54; 305/35 EB; 411/84; 411/966; 198/699; 198/731
[58] Field of Search ............... 305/35 R, 35 EB, 39, 305/51, 53, 54, 55; 411/84, 85, 966; 198/728, 731, 699

[56] References Cited

U.S. PATENT DOCUMENTS

| | | | |
|---|---|---|---|
| 3,390,924 | 7/1968 | Bumbaugh | 305/35 EB |
| 3,765,731 | 10/1973 | Kilbane, Jr. | 305/35 R |
| 3,829,174 | 8/1974 | Thomas | 305/54 X |
| 3,883,190 | 5/1975 | Kilbane, Jr. | 305/54 X |
| 4,059,315 | 11/1977 | Jolliffe | 305/35 R |
| 4,123,119 | 10/1978 | Stedman | 305/54 X |
| 4,281,882 | 8/1981 | van der Lely | 305/35 R |
| 4,332,424 | 6/1982 | Thompson | 305/54 X |
| 4,784,552 | 11/1988 | Rebentisch | 411/85 |
| 5,033,801 | 7/1991 | Beeley | 305/54 |
| 5,054,978 | 10/1991 | Kowalski | 411/85 |

Primary Examiner—Russell D. Stormer
Attorney, Agent, or Firm—A. Ray Osburn

[57] ABSTRACT

A cleat assembly for an endless track vehicle, wherein the mounting nuts are retained and carried by an elongate member spaced apart to receive the mounting bolts, so that a single workman may install or remove the cleat assembly from the endless belt, and so that the cleat may utilize a closed box design of great strength and rigidity.

3 Claims, 5 Drawing Sheets

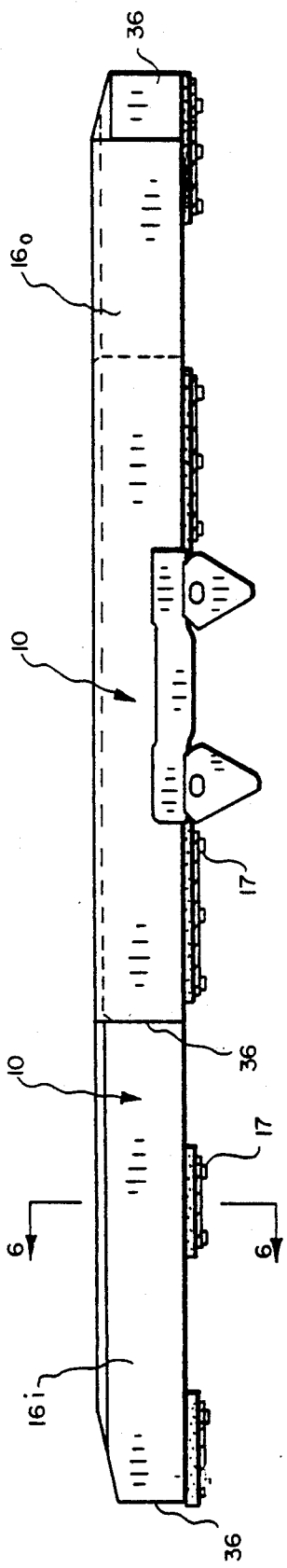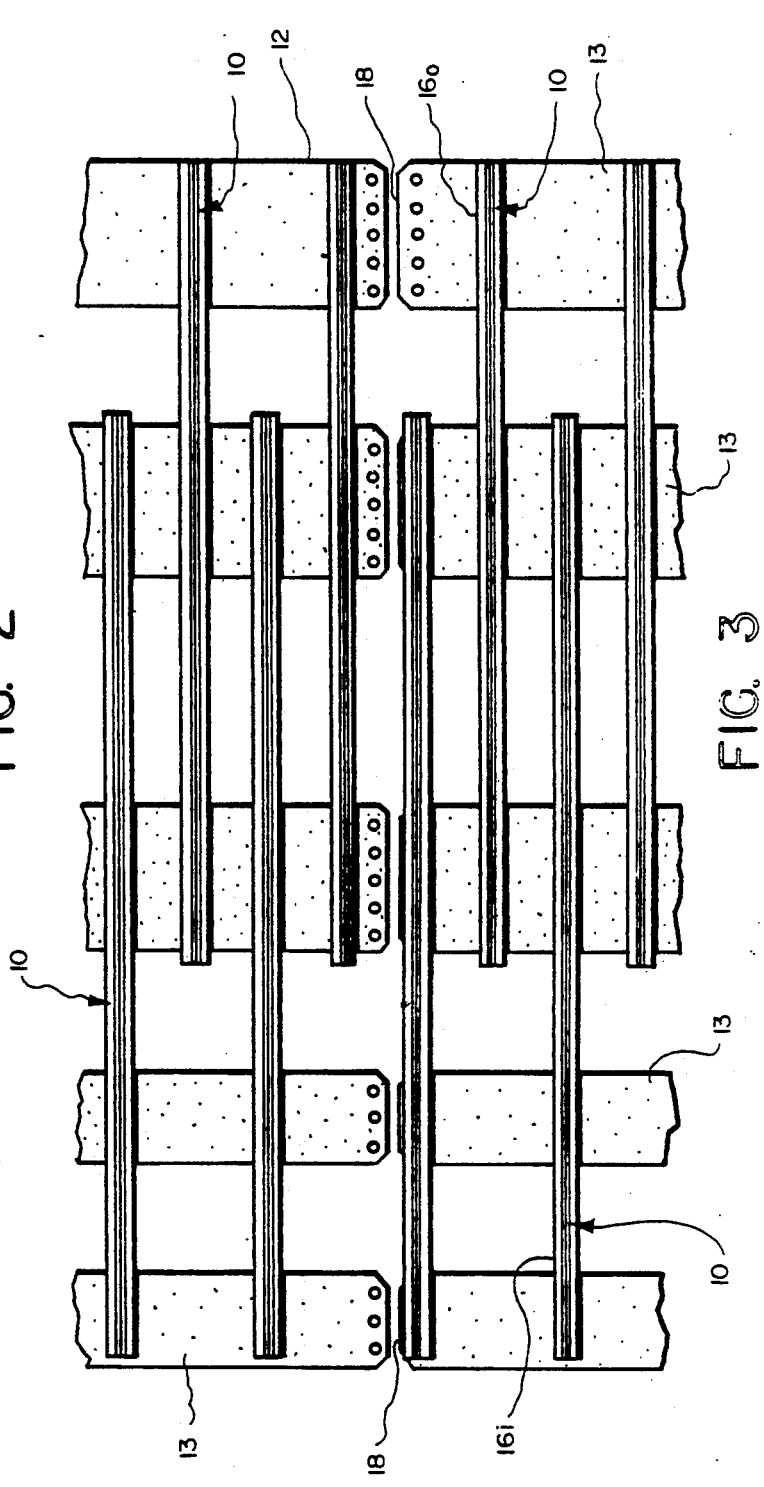

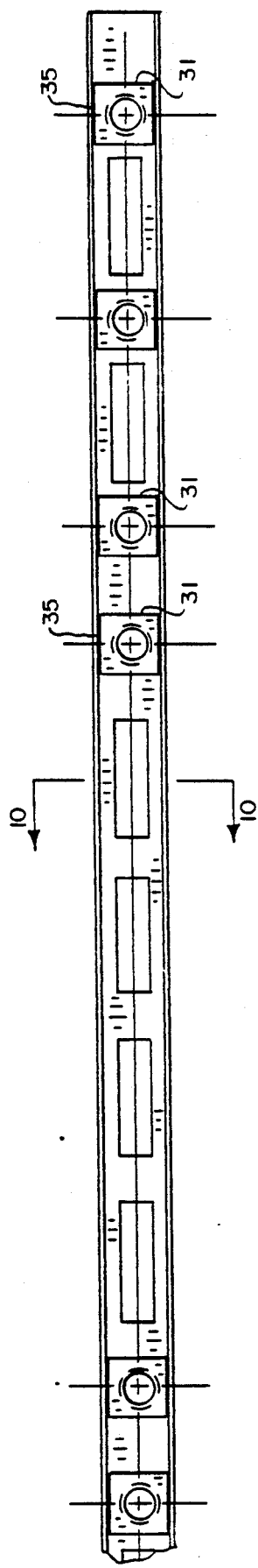
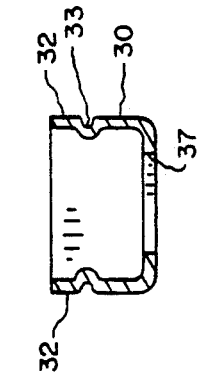
FIG. 10
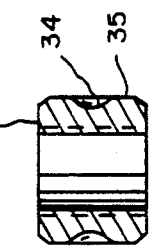
FIG. 9
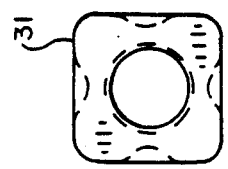
FIG. 8
FIG. 7

NOT RETAINING CLEAT FOR VEHICLE ENDLESS TRACK

BACKGROUND OF THE INVENTION

1. Field:

The field of the invention is endless track assemblies for snow grooming vehicles, and more particularly the cleat assemblies thereof, including structures for fastening the cleats to the flexible plastic belting of such tracks.

2. State of the Art

Snow groomer vehicles use endless tracks made up of flexible plastic belts made continuous by lacing their ends together. Actual lacing thread my be used, although lacing joint assemblies are more commonly employed, being a combination of metallic hinge plates and an associated hinge pin. The snow grooming vehicle commonly has an endless track assembly on each of its sides, each comprising a number of fabric reinforced plastic belts. The belts are spaced apart to provide a broad base for the track while utilizing minimum amounts of belting. Steel cleat assemblies are bolted across the individual belts at intervals, tieing them together into a track assembly. Each assemblied track is engaged by a power-transmitting sprocket wheel, which forces the belts to travel together around a set of guiding wheels called bogies. The powered belt imparts horizontal shear forces to the cleats, which engage the snow to propel the vehicle. Extensive development has gone into the design of the elongate cleat members, with the objectives of providing maximum forward traction, along with substantial resistance to side slipping. Cleat constructions are disclosed in U.S. Pat. Nos. 3,765,731, 4,560,211, 4,281,882 and 4,059,315. Typically, the ground contacting cleat, also called a "grouser", is fastened to the outside of the flexible belting by bolts installed in matching holes in the grouser, the belt, and a metal backing plate on the inside of the belt. A large number of bolt and nut assemblies are required, so that cleat assembly is quite time consuming. Further, at least two assembly workers are required, because bolt heads and nuts, on opposite sides of the belts, cannot be reached simultaneously by a single individual. The large number of bolt assemblies is required to exert the shearing forces against the belt holes, even though dimpled belt grabber plates may be employed between the grouser and the belt. See U.S. Pat. No. 5,033,801. Not only is the initial assembly time consuming, but cleat replacement is often necessary because of bolt or grouser failure. This is especially difficult in the field, and generally requires returning the vehicle to a maintenance and repair shop. Prior art grouser designs are seriously weakened to provide an open side for bolt and nut access, exacerbating the breakage problem. (Prior Art FIG. 11)

Some prior art cleat designs have attempted to deal with the problem of handling a large number of separate cleat retaining nuts by welding or otherwise fastening the nuts directly to the grouser plate, such as by welding. These have generally proven unsatisfactory. Welding of the nuts on the hardened cleat material tends to create a problem with loss of hardness in the critical nut and bolt area. Further, breakaway of welded nuts is a common problem. If the attachment of the nuts to the grouser is effective and permanent, a further problem exists in that the damage to a single nut, as by cross threading or the like, then requires replacement of the entire grouser-nut assembly.

A cleat assembly design of greater strength is needed, capable of installation and replacement by a single person.

BRIEF SUMMARY OF THE INVENTION

The aforesaid disadvantages of the prior art eliminated or substantially alleviated by providing an improved cleat assembly comprising a generally rigid mounting bolt nut retaining and positioning member extending generally the full length of the grouser plate of a cleat assembly, said nut retaining member holding each cleat mounting nut in proper position for engagement by each one of a set of cleat mounting bolts installed through sets of matching holes through the grouser plate and flexible belting of an endless track assembly.

Preferably, the nut retaining member comprises a downwardly opening channel, with bores through its web spaced apart to receive the mounting bolts therethrough. Downstanding channel legs carry a pair of opposed inward projections at each bolt clearance hole. Corresponding mounting nuts, preferably square, each have a pair of opposed parallel faces, each carrying a depression placed to accept the inward projections of the channel. The nuts are forcibly inserted into the channel and each retained in proper location for engagement by the corresponding mounting bolt. Using the channel member with installed nuts, a single workman may install the cleat assembly by applying appropriate tools only to the bolt heads on the side of the belt opposite the grouser plate. The bolt tightening torque is resisted on each nut by the rigid channel member. The channel, proportioned to avoid contact with the grouser plate, carries no clamping load, and need not be highly hardened.

Preferably, the improved cleat assembly utilizes a grouser plate in structurally strong closed box form, the need for direct access to each individual mounting nut being eliminated. The nut retaining channel, with properly spaced nuts, is inserted as a unit through one of the open ends of the closed box grouser plate.

It is therefore the principal object of the invention to provide a cleat assembly for an endless track assembly for a snow grooming vehicle, which facilitates its assembly and disassembly and permits greater freedom in selection of grouser plate designs.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
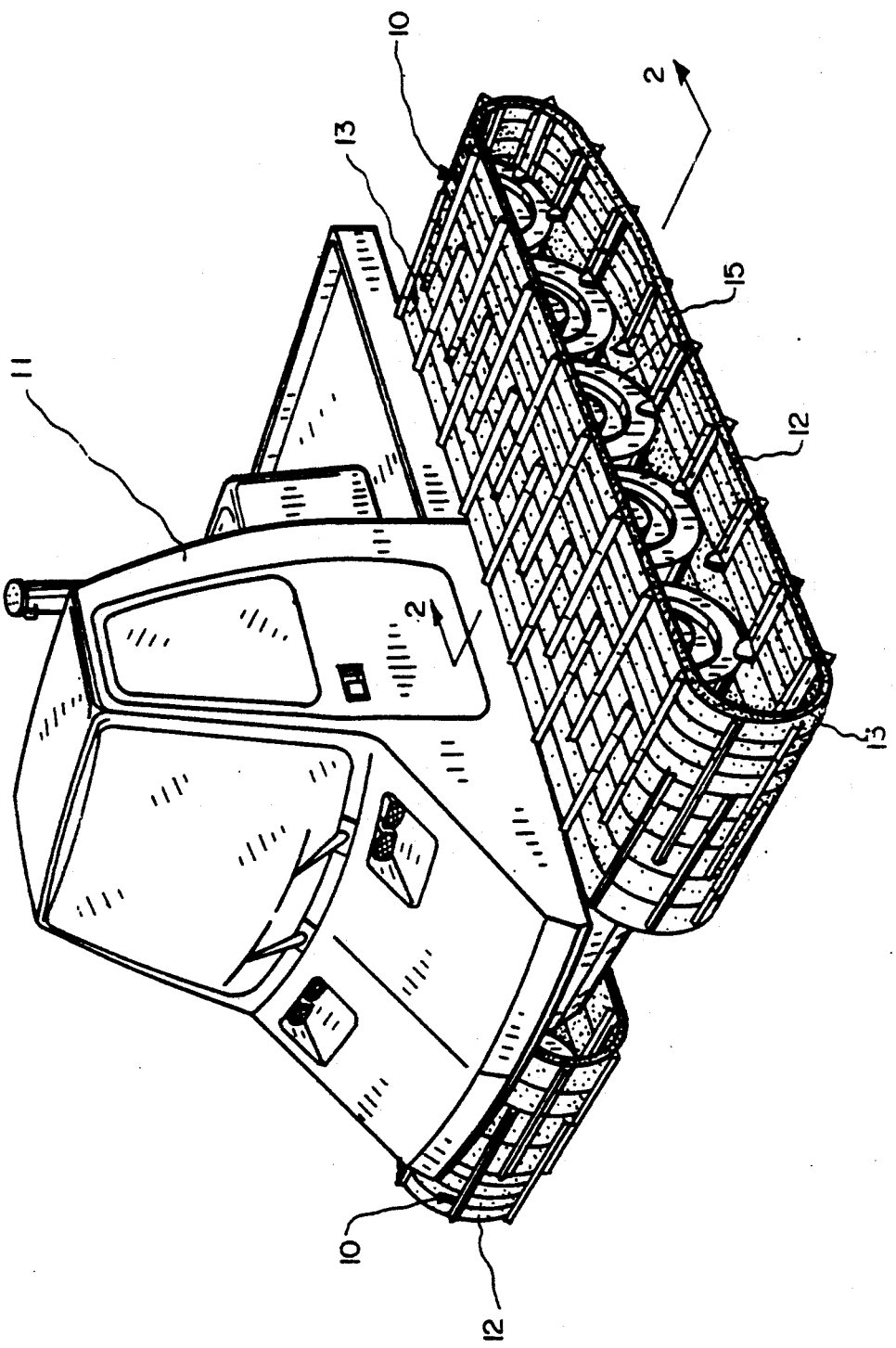
FIG. 1 is a perspective representation of an endless track vehicle incorporating the nut retaining cleat of the invention, drawn to a reduced scale, FIG. 2 a cross sectional view of the endless track of FIG. 1, taken along line 2—2 thereof, drawn to a reduced scale larger than that of FIG. 1, FIG. 3 a top plan view of a fragment of the endless track of FIG. 1, drawn to a reduced scale slightly smaller than that of FIG. 2, FIG. 4 a plan view of a fragment of one of the individual flexible belts of the endless track of FIG. 1 showing the belt lacing joint of one of the belts thereof, drawn to a reduced scale somewhat larger than that of FIG. 2, FIG. 5 a vertical cross sectional view of the lacing joint of FIG. 4, taken along line 5—5 thereof, drawn to the same scale, FIG. 6 a cross sectional view of a fragment of the endless track of FIG. 1, taken along line 6—6 of FIG. 2, drawn to substantially full scale, FIG. 7 a perspective view of a fragment of the torque nut retaining channel of the invention, drawn to approximately one-half full scale, FIG. 8 a plan view of the torquing nut of the invention, drawn to full scale, FIG. 9 a cross sectional view of the torquing nut of FIG. 8, taken along line 9—9 thereof, drawn to the same scale, FIG. 10 a cross sectional view of the nut retaining channel of FIG. 7, taken along line 10—10 thereof, drawn to an enlarged scale, and FIG. 11 a cross sectional view of a fragment of a prior art endless track assembly, drawn to approximately the scale of FIG. 6.
Figure 6:
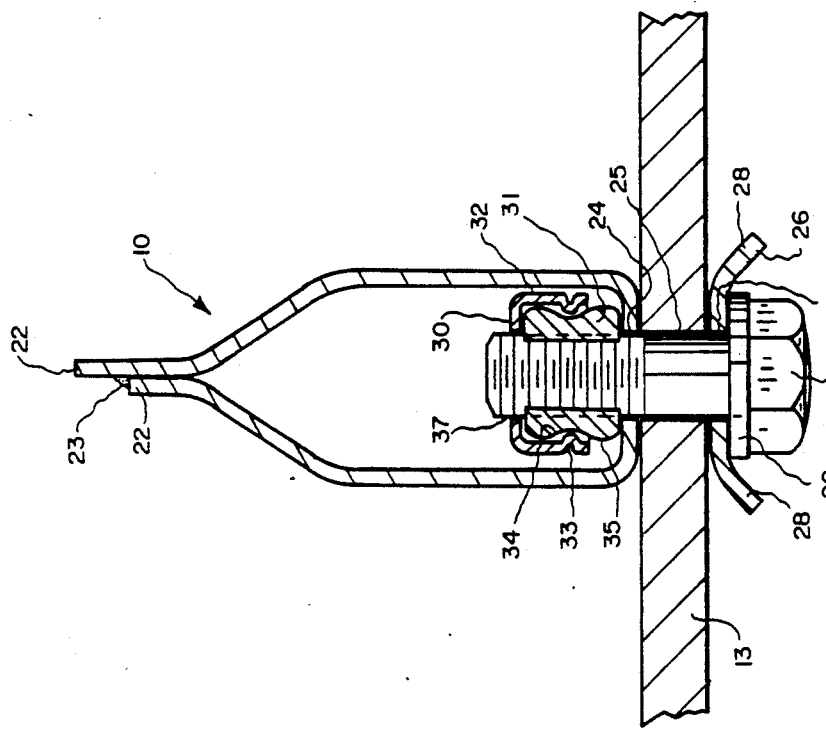

An endless belt track, with a multiplicity of cleat assemblies 10 in accordance with the invention, is shown in FIG. 1 installed upon an off-road vehicle 11. Vehicle 11 may, for example, be used to propel a snow tiller or other ski run grooming implement. The track assembly 12 comprises a number of belts 13 of flexible fiber reinforced plastic secured spaced apart by the laterally directed cleat assemblies 10. Lacing assemblies 14 connect opposing ends of each belt 13, making track 12 endless. Track 12 is supported on the vehicle by wheels 15, one being a drive sprocket engaging the cleats 10. Each cleat 10 has a ground engaging, shaped plate 16 called a grouser. Grousers 16 have been employed in many configurations, each calculated to provide improved traction with the snow, prevent side slip of the vehicle, or otherwise perform more desirably and efficiently. However, the present invention is not concerned primarily with traction developing qualities, but with improved methods for fastening the grousers to the belts 13. However, the fastening provisions of the invention also permit greater freedom in grouser design, as explained below.

Figure 4:
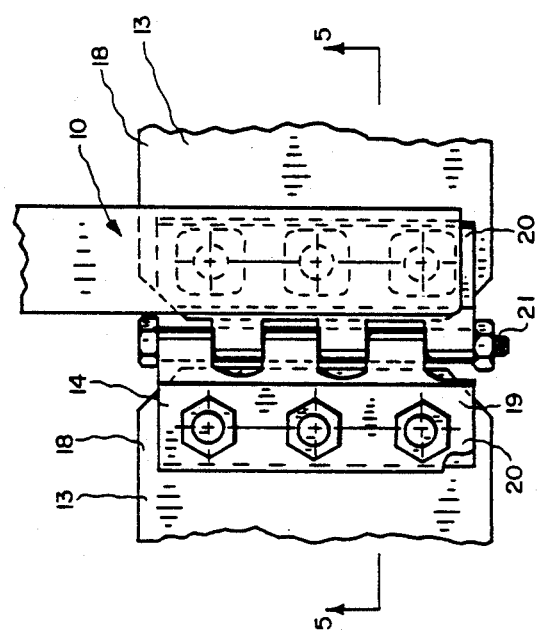
Figure 5:
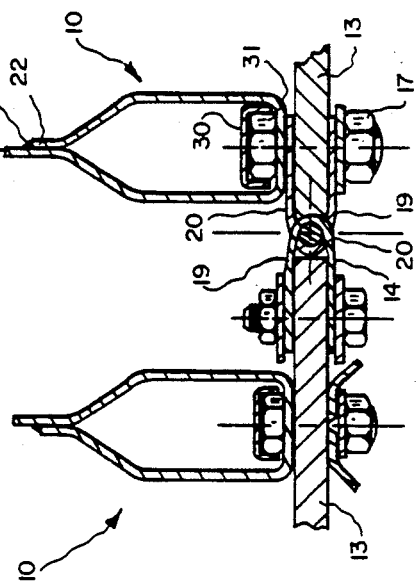
Figure 11:
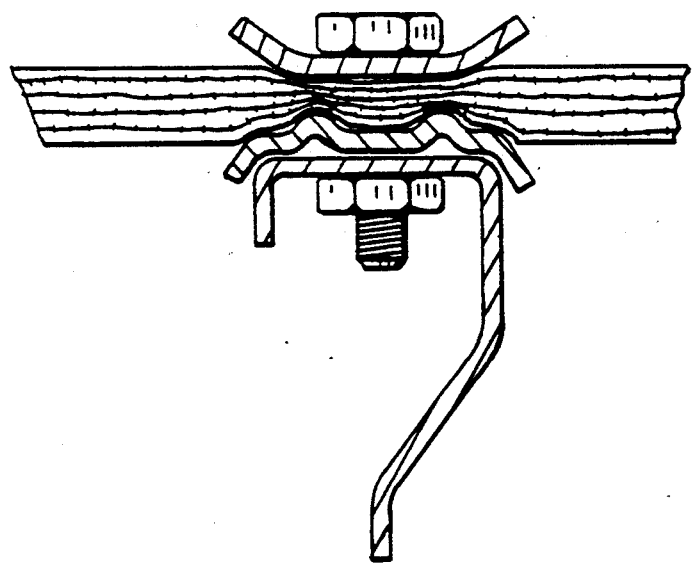

Illustrated track 12 has three inside belting strips 13 used with a pair of narrower outside strips 13. (FIG. 3) Lateral inside grouser plates 16i are secured to the three inside belts 13 by bolts 17. Outside grouser plates 16o are bolted spanning the pair of outside belts 13 and the centermost two of the inside belts 13, laterally overlapping inside grousers 16i. Wheel guide assemblies 18 are bolted projecting from the overlapping grouser portions between belts 13. Belt ends 18, shown free in FIG. 3, are in fact attached by lacing hinge assemblies 19. (FIGS. 4 and 5) Hinge plates 20 are bolted through holes, not shown, in the belt ends, and are connected by a hinge pin 21. Bolts 17 are sometimes used to secure both the hinge plate 20 and one of the grouser plates 16.

Grouser plate 16 is "U" shaped at the belts 13 and bolts 17, with side portions formed to at full length welds 23. It is possible to utilize this extremely rigid, strong, box construction because, as will be evident from the following, access to the individual grouser mounting bolts is not necessary. Spaced apart grouser mounting holes 24 mate with corresponding belt mounting holes 25. A belt backing plate 26 extends laterally across each belt strip, preferably stiffened by downwardly bent edge portions 28, avoiding damage to the flexing belt structure. Preferably, hardened locking washer 29 accompanies each hardened mounting bolt 17, helping to withstall any loosening from long term creep of the material of belts 13.

Inside each box grouser 16, extending its full length is a downwardly opening elongate channel member 30. A torquing nut 31 is prepositioned at each mounting bolt location, secured within channel legs 32. Opposing pairs of inwardly projecting dimples 33 engage matching depressions 34 in opposing, parallel, side faces 35 of each nut. (FIGS. 8 and 9)

To install cleat assembly 10 upon endless track 12, each grouser 16 is placed across appropriate associated belts with the grouser mounting holes 24 in alignment with belt mounting holes 25. Then, channel 30 with spaced nuts 31 is placed, through an open grouser end 36, with the nuts each aligned with belt and grouser mounting holes. The mounting bolts 17 are then installed through backing plates 26, belts 13 and grousers 16 to engage the threads of torquing nuts 31. In practice, it is advantageous to first engage tire guide bolts 17g, to firmly position channel and nuts upon the grousers, before attempting to align and engage the belt securing bolts 17.

The nut depressions 34 are preferably sized to allow nuts 31 to float a small amount for alignment with bolts 17. Nut rotation during cleat assembly is resisted by channel legs 32. (FIG. 7) Bolt clearance hole 37 in the channel web 38 isolates channel 30 from the vehicle driving load resisting cleat structure. Channel 30 does not contact grouser 16, while nuts bolts, grouser and belt are all in forcible frictional contact. Accordingly, channel 30 may be of unhardened, unalloyed steel.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A cleat to be assembled attached to the flexible belting of a vehicle endless track, the track comprising at least one endless flexible belt carrying longitudinally spaced sets of holes for mounting the cleat transversely to the belt, said cleat comprising:
   an elongate grouser plate having a generally planar belt contacting portion, having mounting holes therethrough matching the holes of one of the sets carried by the belt;
   an elongate backing plate having holes matching the mounting holes of the grouser;
   a mounting bolt operable through each of the matching holes to secure the backing plate, the belt, and the grouser together;
   a multifaced torque nut sized to be engaged by each mounting bolt; and
   an elongate member grasping a pair of opposed sides of each of the torque nuts, preventing rotation thereof with respect to said member, and holding said nuts spaced apart in matching relationship to the grouser mounting holes, the elongated member being installed along the belt contacting portion of the grouser.

2. The cleat of claim 1, wherein the rigid torque nut grasping member comprises:

an elongate channel member having a web portion and a pair of spaced apart leg members, said web portion carrying bolt clearing holes therethrough, spaced apart in matching relationship to the associated set of cleat mounting holes of the backing plate, grouser and belt;

a pair of opposed, inwardly projecting, dimples carried by the leg members of the channel at each bolt clearing hole; wherein each torque nut carries at lest one pair of opposed parallel faces spaced apart to allow closely clearing insertion of the nut between the channel leg members, each face carrying a dimple-receiving depression, so that the nuts are retained within the channel in bolt-receiving positions.

3. The cleat of claim 1, wherein:

the grouser plate is configured to include an open-ended, closed box portion.

* * * * *